US010325527B2

(12) United States Patent
Wolff et al.

(10) Patent No.: US 10,325,527 B2
(45) Date of Patent: Jun. 18, 2019

(54) LABEL FOR FORGERY-PROOF IDENTIFICATION OF AN OBJECT, AND METHOD

(71) Applicant: Schreiner Group GmbH & Co. KG, Oberschleissheim (DE)

(72) Inventors: Thomas Wolff, Unterschleissheim (DE); Peter Seidl, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 15/566,012

(22) PCT Filed: Apr. 11, 2016

(86) PCT No.: PCT/EP2016/057908
§ 371 (c)(1),
(2) Date: Oct. 12, 2017

(87) PCT Pub. No.: WO2016/166054
PCT Pub. Date: Oct. 20, 2016

(65) Prior Publication Data

US 2018/0114468 A1 Apr. 26, 2018

(30) Foreign Application Priority Data

Apr. 13, 2015 (DE) ........................ 10 2015 105 594

(51) Int. Cl.
*B42D 25/30* (2014.01)
*G06F 21/04* (2006.01)
(Continued)

(52) U.S. Cl.
CPC ........... *G09F 3/0294* (2013.01); *B42D 25/30* (2014.10); *G09F 3/0292* (2013.01); *G09F 21/04* (2013.01);
(Continued)

(58) Field of Classification Search
CPC ................. G09F 3/0294; G09F 3/0292; G09F 2003/0277; G09F 21/04; G09F 2003/0213; B42D 25/30
(Continued)

(56) References Cited

U.S. PATENT DOCUMENTS 2,333,641 A 11/1943 Corwin
5,885,677 A * 3/1999 Gosselin ............... G09F 3/0292 283/101

(Continued)

FOREIGN PATENT DOCUMENTS

CN 101375186 A 2/2009
CN 103996352 A 8/2014

(Continued)

OTHER PUBLICATIONS

International Search Report of PCT/EP2016/057908, dated Jun. 22, 2016.

*Primary Examiner* — Justin V Lewis
(74) *Attorney, Agent, or Firm* — Collard & Roe, P.C.

(57) ABSTRACT

A label to identify an object has an inscribable layer composite for receiving a first, visible inscription to identify an object, an adhesive film for adhering the label to an object, and an active substance, which, when contacting the object surface, penetrates into and/or acts on the object surface. The active substance is disposed on the label rear side in a structured active surface layer, on, in, or underneath the adhesive film. The structured active substance layer includes a partial surface region or multiple partial surface regions of the label base surface. When the label is adhesively affixed to the object surface, the active substance on the label rear side selectively contacts the object surface in the structured active substance surface region. Within the base label surface, the structured active substance layer has the shape
(Continued)

Figure 1:
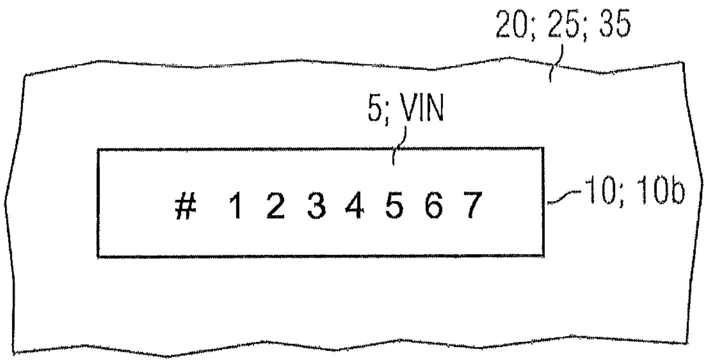

and/or contour of a further, initially-invisible inscription, identification or item of information.

13 Claims, 6 Drawing Sheets

(51) Int. Cl.
*G09F 3/00* (2006.01)
*G09F 21/04* (2006.01)
*G09F 3/02* (2006.01)

(52) U.S. Cl.
CPC ................ *G09F 2003/0213* (2013.01); *G09F 2003/0277* (2013.01)

(58) Field of Classification Search
USPC ........ 283/67, 70, 72, 74, 81, 94, 95, 96, 98, 283/99, 101, 109
See application file for complete search history.

(56) References Cited

U.S. PATENT DOCUMENTS

| | | | |
|---|---|---|---|
| 6,066,437 | A | 5/2000 | Kosslinger |
| 6,076,859 | A | 6/2000 | Hall et al. |
| 6,592,972 | B1 | 7/2003 | Trantoul |
| 6,953,206 | B1 | 10/2005 | Dilz et al. |
| 7,239,380 | B2 | 7/2007 | Wild et al. |
| 7,674,532 | B2 | 3/2010 | Einhorn et al. |
| 8,028,914 | B2 | 10/2011 | Sakuma et al. |
| 2014/0230998 | A1 | 8/2014 | Tani et al. |

FOREIGN PATENT DOCUMENTS

| | | | |
|---|---|---|---|
| DE | 3 813 303 | C1 | 7/1989 |
| DE | 199 09 723 | C1 | 9/2000 |
| DE | 100 10 487 | A1 | 9/2001 |
| DE | 696 19 708 | T2 | 3/2004 |
| DE | 600 26 289 | T2 | 9/2006 |
| EP | 0 338 456 | B1 | 10/1989 |
| EP | 0 866 750 | B1 | 4/2001 |
| EP | 0 896 707 | B1 | 3/2002 |
| EP | 1 109 675 | B1 | 3/2006 |
| EP | 1 502 859 | B1 | 9/2008 |
| EP | 1 769 485 | B1 | 9/2010 |
| WO | 97/40484 | A1 | 10/1997 |
| WO | 2012/135085 | A1 | 10/2012 |

* cited by examiner

LABEL FOR FORGERY-PROOF IDENTIFICATION OF AN OBJECT, AND METHOD

CROSS REFERENCE TO RELATED APPLICATIONS

This application is the National Stage of PCT/EP2016/057908 filed on Apr. 11, 2016, which claims priority under 35 U.S.C. § 119 of German Application No. 102015105594.5 filed on Apr. 13, 2015, the disclosure of which is incorporated by reference. The international application under PCT article 21(2) was not published in English.

The application relates to a label for identification of an object, as well as to a method for production of at least one such label.

In the most varied fields of technology, objects are produced, processed and/or processed further, used or sold, the surface of which objects is provided with a label, permanently or at least temporarily, for example for identification of the individual object, for example with a serial number or part number, or to indicate other properties, components, purposes of use, manufacturer data or customer data, or any other kind of information, or also simply in order to affix symbols.

For example, in the most varied fields of technology, objects are produced, processed and/or processed further, which objects are coated or are to be coated with a paint layer. The object can be covered or painted with a paint layer from all sides, for example, or at least one side of the object is coated with the paint layer, for example on the entire or full surface, or in any case over part of the surface. The outside or the visible outer surfaces of the object, in particular, are frequently painted, above all in the case of objects that are exposed to weathering or the color design of which is intentionally selected.

In order to be able to identify such painted objects using labels, in reliable and lasting manner, i.e. in forgery-proof manner, irreversibly and permanently, labels configured in suitable manner are required.

Suitable labels are required, in particular, for vehicles, particularly for motor vehicles and for their components, accessories, vendor parts and replacement parts, etc., for example in order to thereby affix serial numbers, vehicle identification numbers (VIN; [in English:] Vehicle Identification Number), and other origin and manufacturer information, as well as inspection and approval identification, in forgery-proof manner.

Such information, such as, for example, the vehicle identification number VIN, is applied using self-adhesive labels, in more or less forgery-proof manner, for example using labels that contain a laser-inscribed colored laser film or a black and white laser film. Such labels can, however, be manipulated, forged, removed and/or replaced with a different label, with fraudulent intentions. For example, it is generally not easily evident from the paint layer of a vehicle part or the surface of such an object, after a label has been removed, whether and where a label was previously affixed to it.

In some cases, labels are used that have an adhesive layer applied to their rear side, which layer is permeated with Lumogens, i.e. with luminescent substances. After the label has been removed by an unauthorized person, it is possible to detect, at least using a UV lamp, whether and where the label was situated on the layer of paint, particularly vehicle paint, or on the surface. However, furthermore conclusions beyond this are hardly possible, other than that a manipulation effort obviously took place. However, manipulation can also be carried out to the effect that the luminescent outline of such a label is imitated, i.e. subsequently produced on the vehicle paint of the vehicle part. It is then difficult to determine whether a true imprint of an authorized VIN label or only a forged or imitated VIN label imprint is involved. Furthermore, in the case of luminescent imprints, even of true VIN labels, the luminescence effect decreases after a relatively short time; typically within a few months, so that finally, the outline of the label disappears completely.

In addition, there are labels in which detection means for visible detection of common solvents, which have already been used for fraudulent removal of labels from the vehicle parts, are contained. However, such labels only provide proof of manipulation if a solvent was actually used during the manipulation attempt.

Therefore, up to the present, there has been no satisfactory, reliable, and lasting solution for forgery-proof and manipulation-proof identification of the surface of objects, for example for labeling of paint layers of painted objects, i.e. of paint surfaces. A better and more forgery-proof possibility for affixing labels is required, among other things, for vehicles and vehicle parts, i.e. for their surfaces painted with vehicle paint or car paint. It would be desirable to make more reliable and more lasting identification possibilities available for this purpose.

It is the task of the present invention to make available a label that makes possible reliable, lasting, and stable identification of the surface of objects, for example of paint surfaces of painted objects and, in particular, of paint surfaces of vehicles and vehicle parts. Furthermore, a method for the production of such labels is supposed to be made available.

This task is accomplished by means of the label according to claim 1 and by means of the method according to claim 16.

The label according to claim 1 possesses an inscribable, for example laser-inscribable layer composite, in which a visible inscription for identification of an object, for example a vehicle part or another painted or also unpainted object can be formed.

The label furthermore possesses an adhesive film and an active substance that penetrates into the surface of an object and/or acts on it when it is brought into contact with a surface of an object.

The active substance can be, for example, an active substance that penetrates into the vehicle paint and/or acts on the vehicle paint when it is brought into contact with vehicle paint or with a vehicle part painted with vehicle paint.

In the following, for the sake of brevity, reference will no longer be made to just any objects, but rather only to paint surfaces, i.e. to object surfaces formed from paint layers and/or provided with them, particularly to painted surfaces of vehicles and vehicle parts. Therefore, in the further description of this application, it will not constantly be explicitly pointed out that in place of labels or active substances contained in them, which are intended for vehicle paint or for some other paint, labels and/or active substances for other types of object surfaces, for example unpainted surfaces, are also being considered. The label or its active substance merely needs to have a composition such that the active substance interacts with the surface of the object or its coating, i.e. with the material or the material component at the surface of the object or the surface of its coating. The above circumstances are always presumed in the following description, and will not be explicitly repeated every time.

The active substance is disposed on the rear side of the label, optionally on the adhesive film or also underneath it, i.e. at an even greater distance from the front side of the label. Furthermore, the label is configured, on its rear side, in such a manner that when the label is adhesively affixed to a vehicle part or to a painted object, the active substance selectively comes into contact with the vehicle paint in partial surface regions of the rear side of the label. In this regard, the partial surface regions or the partial surface region, particularly their/its outlines are structured in the form of a further, invisible identification, which is not directly evident when looking at the label, particularly not from the front side of the label.

Contact of the active substance with the paint layer on the vehicle (or with the object surface) therefore only takes place selectively and furthermore in such a manner that the action of the active substance on the vehicle paint or its penetration into the vehicle paint begins immediately after the label is adhesively affixed to the vehicle. For this purpose, suitable active substances can be used, which dissolve or at least partially dissolve the vehicle paint, i.e. initiate dissolution, or which, in any case, bring about a change on or in the paint layer and/or its surface, which change is detectable, visible or at least recognizable. The active substance does not necessarily need to bring about a change that immediately strikes the eye, such as discoloration, for example; it is sufficient if the action of the active substance on the vehicle paint or on the other material that forms the surface of the object or its coating has a composition such that a change can be recognized, at least by the trained eye of the dealer, for example vehicle dealer, or another expert. The label furthermore preferably has such a composition that the change in the vehicle paint, for example, starts to form immediately after the label is adhesively affixed to the vehicle part, i.e. not only when the label is removed.

Furthermore, the label preferably has a composition such that the identification in the vehicle paint or in the other material at the surface of the object or of the material of its coating continues to exist in lasting manner, and does not disappear again even after the label is removed. Furthermore, the label has a composition such that even after the label—or, in any case, its adhesive film and the layer composite disposed above it, to be inscribed or having been inscribed in visible manner—is removed, the action of the active substance on the vehicle paint continues, and preferably even more active substance can penetrate into and/or act on the vehicle paint or the other material of the object or its coating.

The label according to the embodiments of this application has a structured active substance layer that is configured not over the full area, but rather only over a partial area, i.e. is present only in one or in multiple partial surface regions of the basic label surface, and is therefore left out in the remaining part of the basic label surface. The remaining (basic) surface region of the label is therefore free of active substance, specifically over the entire layer thickness of the label or its layer composite. Therefore the contour of the inscription, identification or other item of information that can be transferred to the object and is preferably invisible, at first, is not predetermined by the contour of the label or its basic surface, but rather by the partial surface region(s) (i.e. its/their contour, location and/or size) in which active substance is present in the label. The distribution of active substance over the basic surface of the label, in terms of area, is therefore independent of or different from the contour of the label. Furthermore, it is independent of the contour of the first, visible inscription on or in the label. The further inscription preferably differs from the first, visible inscription, and is transferred or can be transferred when the label is adhesively applied, from the rear side of the label onto the object (either immediately or over a certain period of time).

Here, the basic label surface is understood to mean the surface area over which the label extends, and which results from the contour or the lateral dimensions of the label. If the label or its layer composite has punched-out regions or other recesses over its layer thickness, these recesses do not belong to the basic surface of the label, even if they are surrounded or encircled by the label or its basic surface. Furthermore, the rear side of the label, i.e. rear side of the label surface, with which the label can be dispensed onto the object in order to identify it, must be distinguished from the basic label surface.

Figure 2:
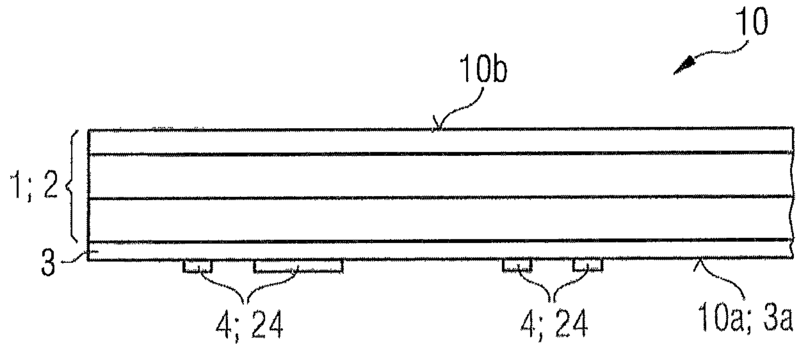
Figure 3:
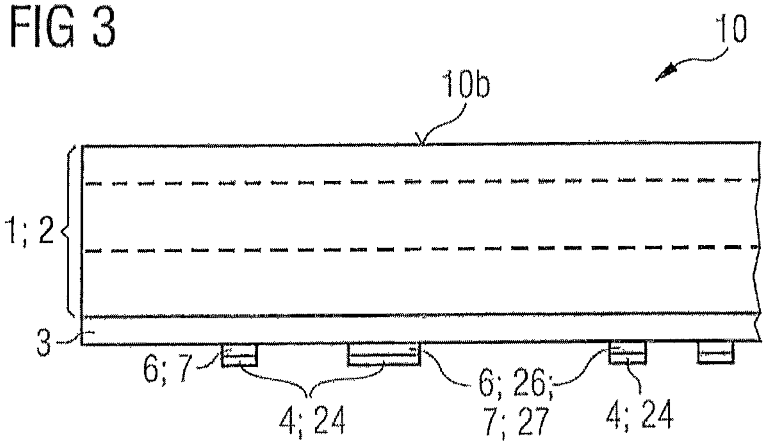
Figure 4:
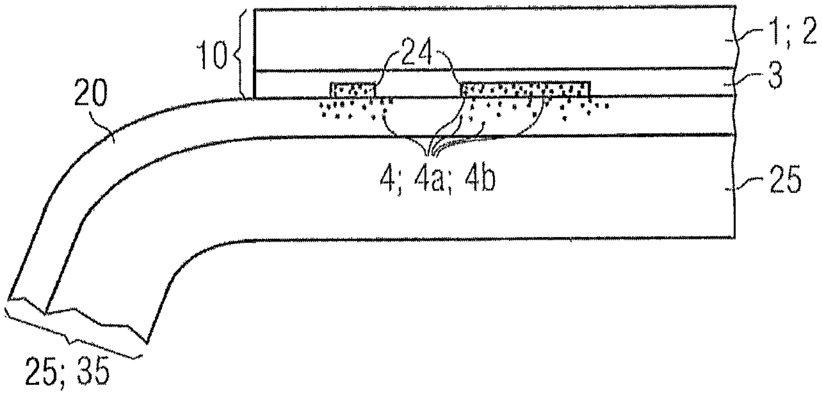
Figure 5A:
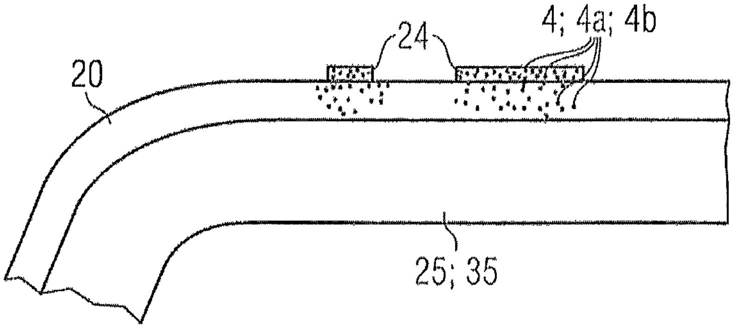
Figure 5B:
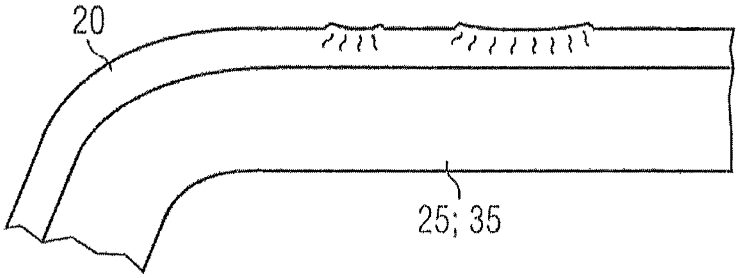
Figure 5C:
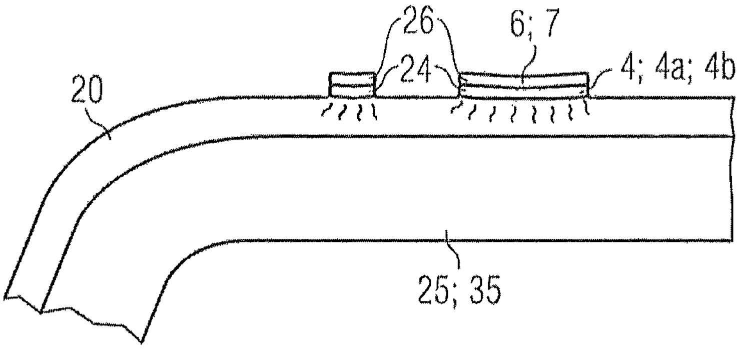
Figure 6:
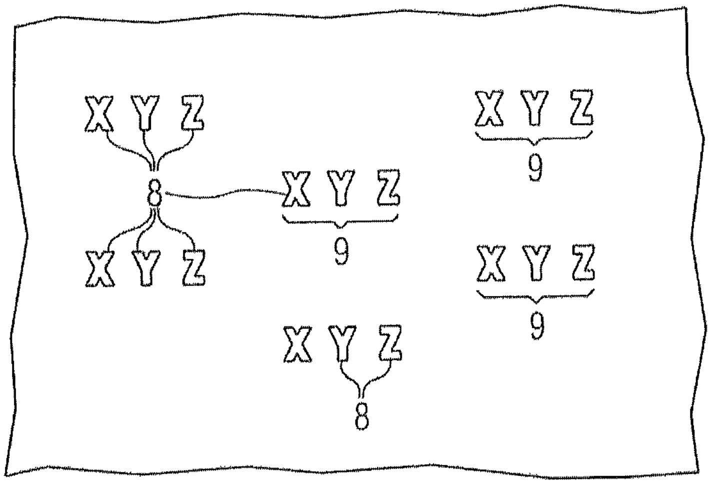
Figure 7:
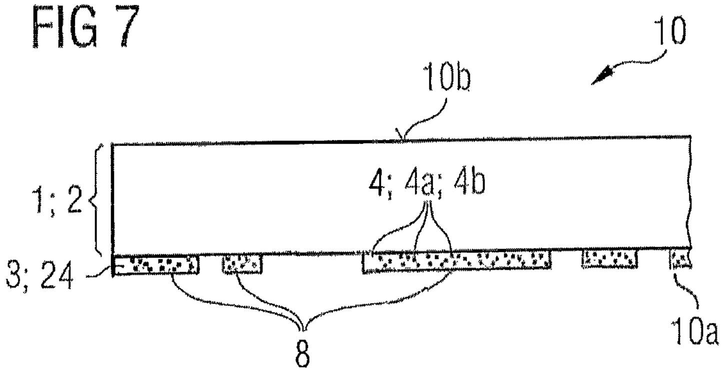
Figure 8:
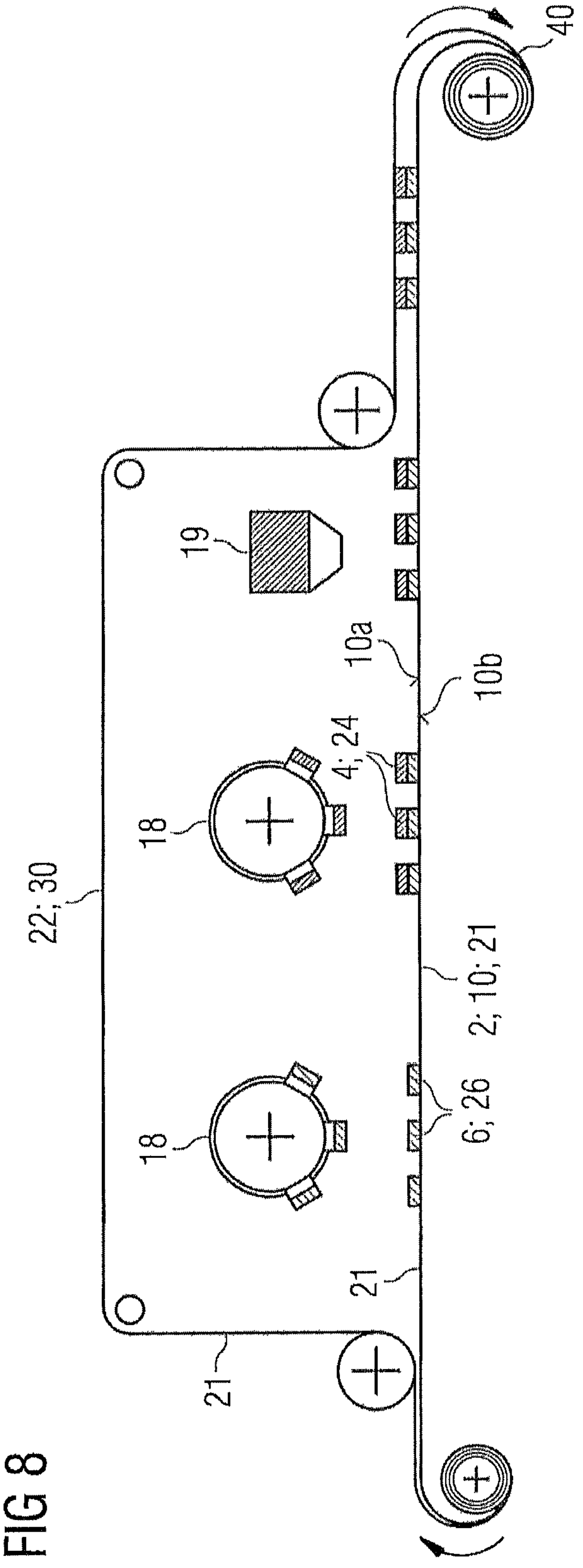
Figure 9:
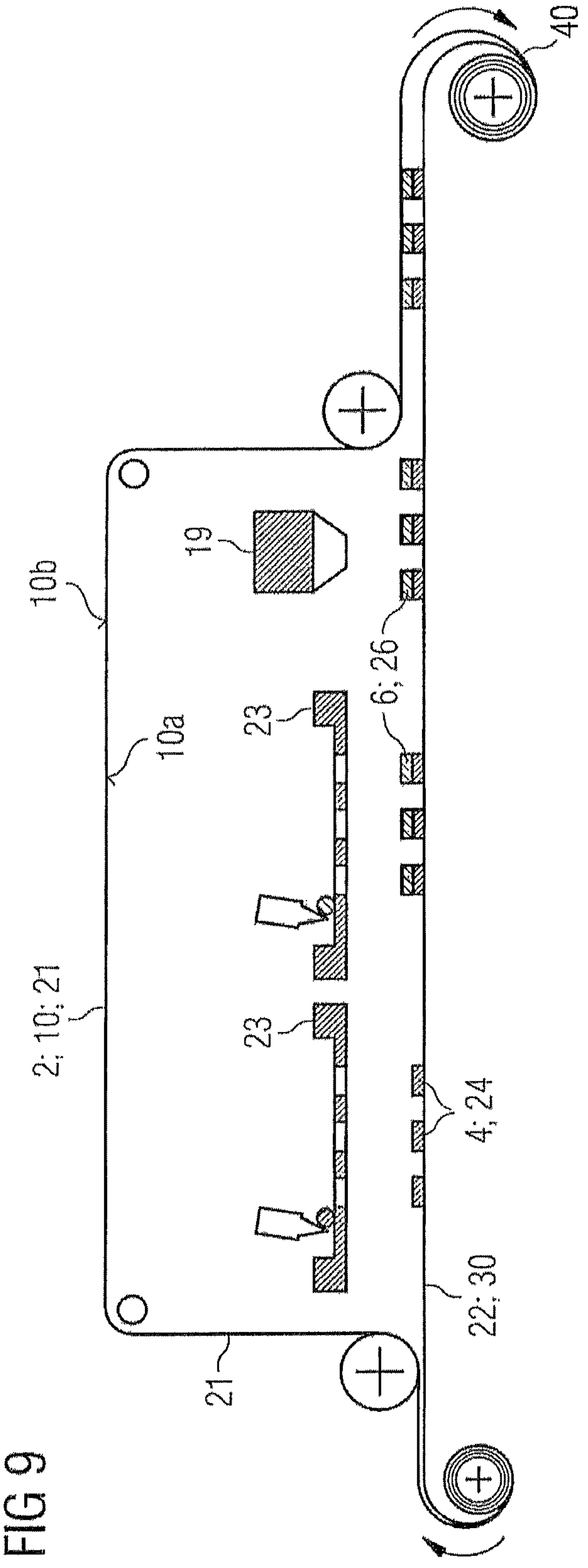

Some exemplary embodiments will be described below, making reference to the figures. These show:

FIG. 1 a schematic top view of a label on an object, for example a vehicle part, FIG. 2 a schematic cross-sectional view through a label, according to one embodiment, FIG. 3 a detailed cross-sectional view which shows a futher structured layer of the label, FIG. 4 a schematic cross-sectional view of an object provided with the label from FIG. 2 or FIG. 3, particularly a vehicle part, FIGS. 5A to 5C the vehicle part from FIG. 4 after removal of the label according to different embodiments, FIG. 6 a schematic top view of the surface of the vehicle part from FIG. 5A, 5B or 5C, FIG. 7 an alternative example of a label, FIG. 8 a first method for the production of a label composite, and FIG. 9 a second method for the production of a label composite.

FIG. 1 shows a schematic top view of a partial piece of an object 35, the surface of which is provided with a label 10. The object can be a vehicle part 25, for example; in particular, a vehicle part 25 painted with vehicle paint. The object can furthermore be an otherwise painted object 35, i.e. covered or provided with a paint layer. The object can furthermore be another type of object, on the surface of which a label is to be affixed. The object can also be unpainted, for example.

Irregardless, in the following, when explaining the figures, for the sake of brevity only a vehicle part will be discussed.

The vehicle part 25 is preferably painted with a paint 20, for example vehicle paint; accordingly, the surface of the vehicle part 25 is a painted surface, and the upper layer of the vehicle part 25 is a paint layer composed of vehicle paint 20. Underneath that, a metal or a metal alloy, for example, is situated, of which the vehicle part or the object 35 or a significant part of it consists.

The adhesively attached label 10 carries a visible and directly readable inscription 5 on its front side 10*b*, shown in FIG. 1, which inscription serves for identification of the vehicle part or of the entire vehicle or object, or it is at least intended for being inscribed with such an inscription. The inscription 5 or visible/readable identification is a vehicle identification number (VIN; Vehicle Identification Number) or another type of inspection or approval identification, alternatively test identification, manufacturer information, a replacement part number, a logo, a graphic element, or some other type of information, or a combination thereof.

The label 10 is preferably a laser-inscribed or laser-inscribable label. The layer composite 1 is preferably a laser-inscribable layer composite, and comprises a colored laser film 2, for example. The adhesive layer, i.e. the adhesive film 3 of the label 10 is disposed on the rear side of the layer composite 1.

In the case of a conventional label, the adhesive film 3 lies on the paint surface of the vehicle part 25 over the full area. In the case of the label 10 shown here, however, a further inscription or other type of identification, which is invisible or in any case cannot be recognized from the front without technical aids, and covered by the label itself, is worked into the label, on the rear side of the label and when the label is adhesively affixed to the vehicle part 25, is transferred to the part or to its paint layer 21, i.e. to the surface of the object 35 or its coating, and remains on the paint layer 20 of the vehicle part 25 or the surface even after the label has been removed, as an irreversible change.

FIG. 2 shows a schematic cross-sectional view of the label from FIG. 1 according to a first exemplary embodiment. The layer sequence for implementation of the layer composite 1, which incorporates the colored laser film 2 or—according to alternative embodiments—the other inscribable film—is only indicated schematically and will not be discussed in greater detail here. In the case of the label 10 from FIG. 2, a structured active substance layer 24 is disposed on the underside or rear side 10*a*, which layer covers partial regions of the adhesive layer 3 from below. In FIG. 2 and the subsequent figures, the dimensions, particularly the layer thicknesses, are not represented true to scale, and are shown in exaggeratedly large size, in part, for a clearer illustration. The structured active substance layer 24 disposed on the rear side 10*a* of the label 10 contains an active substance 4, which is selected in such a manner that when it is brought into contact with vehicle paint, i.e. with a vehicle part painted with this paint, acts on the vehicle paint and/or penetrates into the vehicle paint. The active substance can particularly be a paint solvent or another medium that changes paint, furthermore substances that can be detected and are capable of diffusion in the vehicle paint, particularly substances with luminescence properties. The active substance 4 or the active substance layer 24 is disposed only in partial regions of the rear side 10*a* of the label, and forms a further, at first invisible identification, starting from the point in time that the label is dispensed, which identification is generally different from the visible inscription 5 on the front side 10*b* of the label 10, and only appears or becomes recognizable for a trained eye when the label, which was adhesively affixed to the vehicle part 25 over a certain minimum period of time, which can be relatively short (for example a few months, weeks, days or even shorter; possibly a few seconds are sufficient), is removed from the vehicle part 25.

The active substance 4 does not necessarily have to be an active substance that is intended for vehicle paint or for another paint, i.e. one that interacts or reacts with it, but rather merely needs to be selected and/or composed in such a manner that the active substance 4 interacts with and/or penetrates into the surface of the object 35 to be labeled or its coating, i.e. with the material or a material component at the surface of the object 35 or the surface of its coating.

Regardless, in the following explanations reference will be made only to active substances that interact with paint or vehicle paint or change it, for the sake of brevity.

FIG. 3 shows a more detailed cross-sectional view which additionally shows a further structured layer of the label, namely an ultra violet (UV) protection layer 26 and/or an adhesion-reducing layer 27 or a layer which combines these two properties in itself. For example, this is a layer that consists of UV protection paint 6 or at least contains it. For the sake of clarity, the representation is slightly magnified as compared with FIG. 2; according to FIG. 3, the active substance layer 24 and the UV protection layer 26 or adhesion-reducing layer 27 are structured to have the same coverage, i.e. layer stacks of a double layer occur, with a lateral contour or structure that corresponds to the desired inscription to be left on the paint surface of the vehicle (for example a repeated sequence of letters XYZ; see FIG. 6); for example to a manufacturer name of a vehicle manufacturer.

FIG. 4 shows a vehicle part 25 provided with the label 10 from FIG. 2 or FIG. 3. Partial surface regions of the paint layer 20 come into contact with the active substance layer 24 on the rear side of the label, starting from the point in time when the label 10 is adhesively affixed, and are exposed to the action and/or penetration of the active substance 4 starting from this point in time. The active substance 4 is a paint solvent 4*a*, for example, which locally dissolves the paint surface, initiates dissolution at the surface, liquefies it, dilutes it, or reacts with the material of the paint layer 20 or changes it. Pancreatin or N-methyl-2-pyrrolidone (NMP), for example, can be used as the active substance 4 or paint solvent 4*a*. Alternatively, the active substance 4 can be a luminescence substance 4*b*, particularly a fluorescence substance, which is able to diffuse or migrate within the vehicle paint layer 20, as indicated in FIG. 4, in the paint layer composed of vehicle paint 20, by means of active substance particles or active substance molecules represented in dot form. The surface pieces of the active substance layer 24 thereby serve for formation of lettering that is exposed or is to be exposed after removal of the label, for example manufacturer information or another identification or information listed above.

FIG. 5A shows the vehicle part 25 from FIG. 4 after removal of the label 10 according to a first embodiment of the label, in which the surface pieces of the active substance layer 24 come loose from the adhesive film 3 when the label 10 is pulled off, and remain adhering to the paint surface of the vehicle part 25. Alternatively, the label 10 can also be configured in such a manner that the active substance layer regions 24 are pulled off from the vehicle paint 20 again, simultaneously with the label. In both cases, however, part of the active substance 4, for example of the luminescence substance or the paint solvent, remains in the paint layer of the vehicle part, particularly close to the surface of the paint layer and in surface regions directly under and adjacent to the surface regions of the active substance layer 20. As a result, a further inscription or identification, which can be detected either using aids such as UV lamps or—preferably particularly in the case of use of paint solvents such as pancreatin or NPM (N-methyl-2-pyrrolidone), for example—is recognizable for a trained eye, even without aids, occurs in the paint layer. The two paint solvents mentioned above furthermore have the advantage that their traces in the vehicle paint are almost impossible to remove.

FIG. 5B shows a surface deformation in the vehicle paint, as it occurs locally due to the action of pancreatin or NMP on the paint surface there. In those surface regions that were previously covered by the active substance layer 24, the paint surface of the vehicle paint 20 has become uneven as the result of the paint-dissolving effect. Typically, slight elevations occur at the edge of the surface regions covered with pancreatin or NMP, which elevations surround the surface piece treated with the active substance 4; 4*a*, in each instance. In the surface regions previously covered with active substance, either the paint composition is changed, the layer thickness of the paint layer is slightly reduced, or the material of the paint layer 20 is changed in some other way, as indicated in FIG. 5B. According to FIG. 5B, when the label is pulled off, it is removed in its entirety; including the surface pieces of the structured active substance layer 24. The exemplary embodiment according to FIG. 4, in combination with FIG. 5A (instead of FIG. 5B), in contrast, allows even subsequent action or penetration of further active substance 4 into the vehicle part 25 over a period of time, even after the label 10 was removed a long time ago.

According to the further development shown in FIG. 3, the structured double layer composed of active substance layer 24 and UV protection layer 26 (or, alternatively, of an adhesion-reducing layer 27) can also be transferred to the paint surface. Then the depressions shown in FIG. 5B, surrounded by outer edge elevations, continue to be covered with the surface pieces of the structure active substance layer 24, preferably also with the surface pieces of the UV protection layer 26 and/or the adhesion-reducing layer 27, which are disposed above them, with the same coverage, even after removal of the label, as shown in FIG. 5C. This has the advantage that even after removal of the label 10 from the paint layer of the vehicle part 25, the remaining surface pieces of the active substance layer 24 continue to bring about the formation or stabilization of the inscription or other identification on the paint surface; furthermore, the active substance is protected against environmental influences by the protective layer 26; 27, and thereby better preserved, over an even longer period of time. In the case of a UV protection layer 26, instead of a paint solvent 4*a*, luminescence substances 4*b*, for example, can be protected against decomposition caused by UV radiation, particularly by direct or indirect sunlight. Even when using other protective layers, the respective active substance 4 can continue to develop its unreduced effect even after removal of the rest of the label, i.e. of the adhesive film 3 and of the layer composite 1, on and/or in the paint layer of the vehicle part 25.

FIG. 6 shows a schematic top view of an inscription or other identification, as an example, as it can be produced on and/or in the paint layer of the vehicle part, using the active substance 4; 4*a*; 4*b*. The surface section shown in FIG. 6 is, for example, a surface cutout of the basic label surface. In partial regions of the basic label surface, i.e. in partial surface regions 8, which correspond to lettering or some other identification or part of it, the paint layer has been changed, for example deepened by means of a dissolution process that has at least taken place in the meantime, made less shiny or matte, discolored, made lighter or darker than in the untreated surface regions, or changed locally in some other way. In the example in FIG. 6, the partial surface regions 8, which correspond to the surface pieces of the active substance layer 24 or its recesses, each form individual letters of a lettering (here: XYZ) that stands for a manufacturer name, as an example. The identification produced in this manner is configured, for example, in the form of a scatter print with a plurality of identical inscription fields 9, or at least fields having the same content, here, for example, in the form of an arrangement of many repetitions of the lettering XYZ. The partial surface regions 8 of an individual inscription field 9 are, for example, letters or alphanumeric symbols, the outlines of which correspond to the edges of the surface pieces of the active substance layer (if applicable in addition to the UV protection layer 26 or other protective layer) or its recesses, which pieces were previously in contact are still in contact after removal of the label. The outlines correspond, for example, to the edge elevations shown in FIG. 5B and 5C, as they are formed, for example, by means of the action of the paint solvents pancreatin or NMP (N-methyl-2-pyrrolidone). Alternatively, the partial surface regions 8 can be surface regions in which a luminescence substance has diffused into the paint layer and fluoresces when acted on by a UV lamp. The images of the contour or the surface content of the structured active substance layer 24, shown in FIGS. 2 to 6, which are produced in the paint layer of the vehicle part, can also be the negative image of the inscription or of the motif, instead of an inscription or some other motif.

FIG. 7 shows an alternative example of a label. While in FIG. 2, the active substance 4 is disposed in the active substance layer 24 and thereby on the adhesive film 3, stated more precisely underneath the adhesive film 3, and in FIG. 3, the active substance 4 is contained even deeper, namely in the active substance layer 24, at a distance from the adhesive film 3, by means of the protective layer 26; 27, the active substance 4 according to FIG. 7 is situated in the adhesive film 3 itself. The adhesive film 3 is completely permeated with the active substance 4; 4*a*; 4*b*, but the film itself is not configured over the full area, but rather only over a partial area on the rear side of the label. Therefore the adhesive layer 3; 24 that contains active substance itself forms that partial surface region 8 or those partial surface regions of the rear side of the label, where the active substance can penetrate into the surface of an object when it makes contact with the latter, for example .a paint layer of a vehicle part or some other paint-coated object. The remaining partial surface region of the basic label surface or rear side of the label, in which the adhesive layer 3; 24 that contains active substance is absent, in contrast leaves the surface of the object unchanged, i.e. does not act on the surface of the object. For this reason, no active substance of any kind can penetrate into or act on the surface of the object there, i.e. in the remaining partial surface region without an adhesive layer that contains active substance; not even, for example, under disadvantageous circumstances, such as elevated temperature, severe weathering or many years of use of the labeled object, which is invisibly identified under the label.

In those embodiments of this application in which the active substance or the active substance layer is disposed on the rear side of the label "underneath" the adhesive film, the formulation "underneath" means that—viewed from the top side of the label—the active substance or the active substance layer is disposed even deeper than the adhesive film. This means, in other words, that the active substance or the active substance layer—viewed from the top view of the rear side of the label—is disposed "on" the rear side of the label and/or "on" the adhesive film, either directly on it or (viewed from the rear side of the label) "above" the rear side of the label and/or of the adhesive film; for example, spaced apart from the adhesive film by the layer thickness of the UV protection layer.

The adhesive layer 3; 24 that contains active substance is therefore structured—analogous to the separate, additional active substance layer 24 of FIGS. 2 and 3—within the basic label surface, i.e. configured merely over a partial area instead of the full area. In this regard, the recesses in the adhesive layer 3; 24 that contains active substance from FIG. 7 correspond to the non-covered regions of the rear side of the label between the surface pieces, i.e. partial regions 8 of the active substance layer 24 from FIG. 2 or 3. As a result, the same positive image occurs as that using the labels 10 of FIGS. 2 and 3, for example the positive image shown in FIG. 6. Likewise, however, a negative image can also be produced; for this purpose, the surface pieces of the layer 24 that contains active substance and its recesses must be interchanged with one another, in each instance, in FIG. 7. The same holds true analogously for the active substance layer 24 in FIGS. 2 and 3.

Typical layer thicknesses for the layers of the label shown in FIGS. 2, 3, and 7 amount to 15 to 50 μm for the adhesive film 3; 2 to 20 μm for the (additional) active substance layer 24; and 5 to 50 μm for the protective layer 26 (if present), for example. Instead of a UV protection layer, the layer 26 can also be an anti-adhesion layer or adhesion-reducing layer 27, which facilitates loosening of the surface pieces of the active substance layer 24 from the adhesive film 3 when the label is pulled off. The layer 26 can also combine these two functions in itself and then contain a UV protection paint 6, as well as silicone or some other adhesion-reducing medium, for example. If an adhesive film that contains active substance is present, it can possess a layer thickness between 2 and 50 μm, for example.

For the remainder, the layer thicknesses can be suitably selected in accordance with the method and implementation of the respective printing process. The parting layer or the active substance layer, if application in combination with the intermediate layer (UV protection layer 26 and/or adhesion-reducing layer 27 composed of silicone, for example) can optionally be imprinted on the rear side 10*b* of the label or on the rear side 3*a* of the adhesive film 3, particularly by means of flexographic printing. Alternatively, these layers or at least one of them can be imprinted onto a carrier film disposed under the rear side of the label, for example using screen printing, on the silicone-coated side of the carrier film. In the latter case, the layers 24; 26 come into contact with the rears side 3*a* of the adhesive film 3 when labels and carrier film are joined together. If a combined UV protection and anti-adhesion layer 26; 27 is present, this can contain a proportion of 20% to 40%, for example 30% silicone, and consist of UV protection paint for the remainder.

FIG. 8 schematically shows a first exemplary embodiment of a method for the production of a label composite, which composite comprises a label or a plurality of labels according to the present application. In the method, conventional materials, particularly a label film web 21 and a carrier film web 22, are used; preferably as finished, prefabricated rolled goods, in which the carrier film web is already releasably adhesively affixed, with its front side, to the rear side of the label film web, i.e. onto its adhesive film. The label film web 21 is a conventional, prefabricated product for inscribable labels, for example, particularly for laser-inscribable labels. Accordingly, the label film web 21 preferably comprises a colored laser film 2 or a layer composite 1 comprising such a colored laser film, as it was already mentioned in connection with the above figures. The label film web 21 possesses an adhesive film 3 on its rear side. The carrier film web possesses a silicone coating on its front side, or some other coating that reduced adhesion or adhesive strength, thereby causing the carrier film to be adhesively affixed to the adhesive film in releasable manner.

In the method according to FIG. 8, an active substance layer 24, which contains the active substance 4 for forming an additional, concealed identification on the vehicle parts to be labeled, is imprinted on the label film web 21 as a rear-side active substance layer 24. For this purpose, the label film web 21 and the carrier film web 22 are temporarily separated from one another, over a partial piece of their length, in order to be able to imprint selectively chosen surface regions of the adhesive film 3. Preferably, the printing process is carried out by means of flexographic printing, with other printing techniques also being fundamentally possible. According to FIG. 8, the active substance layer 24 is selectively imprinted onto surface regions of the rear side 10*a* of the label film web 21 using a printing roll 18.

Therefore surface regions or surface pieces of the active substance layer 24, which contain the active substance 4, are formed on the rear side of the label.

FIG. 8 furthermore shows a further development, in which a UV protection layer 26, which contains a UV protection paint, is also additionally imprinted onto the adhesive film 3, specifically with the same coverage with the surface pieces of the active substance layer 24. In this regard, first the surface pieces of the layer 26 are imprinted onto the respective surface regions of the adhesive film 3, and afterward, the surface pieces of the active substance layer 24 are imprinted onto the rear side of the surface pieces of the layer 26. Here, too, flexographic printing is preferably used. Subsequently, the rear side of the label film web 21 is dried using a dryer 19, and finally, it is brought together again with the carrier film web 22. In this process, the finished label composite 40 is formed, either as a rolled product (as shown) or as a sheet product, which can be fabricated; in this composite, the surface pieces of the active substance layer 24 and, if applicable, also surface pieces of the UV protection layer 26, are disposed between the carrier film web 22 and the label film web 21, i.e. between the carrier film 30 and the label 10. The labels that are punched from the finished label composite 40 are therefore suitable for forming concealed identifiers in the paint layer of vehicles, in the paint layer on other objects or, in general, on the surface of any desired objects 35 or the surface of their coating.

In deviation from FIG. 8, an adhesion-reducing layer, for example a layer containing silicone, can be imprinted in place of the UV protective layer 26, before the active substance layer 24 is imprinted on it. The active substance 4 is then not a luminescence substance 4*b*, for example, but rather a paint solvent 4*a*, such as pancreatin or NMP, for example. Furthermore, a layer that contains both a UV protection paint and silicone or another substance for reducing the adhesion to the adhesive film 3 can be printed as the layer 26. Nevertheless, here the adhesion is stronger than the adhesion between the active substance layer 24 and the carrier film web 21; when the carrier film web is released during dispensing of the label, the active substance layer 24 therefore remains adhering to the label 10.

According to a further modification of FIG. 8, an adhesive layer 3 that contains active substance is alternatively used in place of the separate, structured active substance layer 24 (and, if applicable, the layer 26), but this layer is imprinted only over part of the surface of the rear side 10*a* of the otherwise adhesive-free label film web 21. In this modification, an adhesive film 3; 24 that contains active substance is used, i.e. one that itself already contains the active substance 4. Therefore no diffusion of active substance into the paint layer of a labeled vehicle part, for example, is possible on the remaining surface regions of the (rear-side) basic label surface that is not coated with adhesive. The adhesive layer 3; 24 that contains active substance is structured laterally, i.e. within the respective basic label surface, and thereby predetermines the shape or contour of the further inscription, which is at first invisible.

FIG. 9 shows an alternative second method, in which the active substance layer 24 is imprinted onto the carrier film 30 or onto the carrier film web 22. Preferably, screen printing is used as the printing technique. According to FIG.

9, the surface pieces or surface regions of the active substance layer 24 are imprinted onto the front side of the carrier film web 22 (for example by means of a corresponding printing screen 23), after the carrier film web 22 was separated from the label film web 21. As compared with the figurative representation in FIG. 9, the same modifications are possible, which have already been described with reference to FIG. 8. Therefore pancreatin, NMP or some other paint solvent 4*a* can be contained in the active substance layer 24 as an active substance 4, in place of a luminescence substance. Furthermore, instead of a separate active substance layer 24 under the adhesive layer, alternatively an adhesive layer 3; 24 that contains active substance but is structured can be imprinted onto the carrier film web 22, particularly an adhesive film that already contains the active substance 4; 4*a*; 4*b*.

If, according to FIG. 9, an active substance layer 24 is printed, and the active substance is a luminescence substance 4*b*, a further development provides that surface pieces of a UV protection layer 26, having the same coverage, are subsequently imprinted onto the surface pieces of the active substance layer 24; preferably, once again, by means of screen printing. The surface pieces or layer stacks that are produced are subsequently dried, and afterward, the label film web 21 and the carrier film web 22 imprinted on the front side are joined together again. As a result of the adhesive layer of the label film web 21 with the labels 10, the printed layers or layer stacks 24; 26 now adhere to the rear side of the adhesive layer 3 more strongly, i.e. they are released from the carrier film together with the remaining parts of the label when the label is later pulled off the carrier film. The finished label composite 40, just like that from FIG. 8, contains ready-to-use prefabricated labels according to the present application, where it is possible to prefabricate sheet products instead of rolled products, as well.

The label according to the embodiments explained in this application has a composition such that the further, preferably at first invisible inscription, identification or other item of information that is transferred to an object, onto its surface, by means of dispensing the label, results not from the contour of the label as a whole, but rather from the distribution of the active substance over the area, on or close to the rear side of the label. Furthermore, the label has a structure such that those surface regions in which no active substance is supposed to be able to penetrate into the object or act on it are free of active substance, specifically over the entire layer thickness of the label. This guarantees reliable transfer and thereby formation of a clearly outlined image of the original active substance distribution over the surface of the label (which image is clearly recognizable after removal of the label from the object), on or in the object or its surface, specifically even if the duration of action during which the label was dispensed onto the object was very short (for example only a few weeks), if the time period since removal of the label was very long (up to months or years) and/or if varying temperature influences, weathering influences or other influences have already made the readability or recognizability of the contours of the transferred (further) inscription on the object more difficult to ascertain.

The inscription, which is transferred to the object as intended, is an inscription that is latently present in the label, and is predetermined by means of the selective distribution of the active substance over the basic surface of the label or by the label surface. This inscription, identification or other item of information, along with the readable inscription that is visible on the front side, forms an additional, further inscription that is preferably not visible on the label; not even from the exposed rear side of the label. This inscription, identification or other item of information is transferred or at least can be transferred, as intended, when the label is adhesively affixed to an object, onto this object or its surface. Transfer of the further inscription does not already need to take place when the label is dispensed, but rather can happen during a longer period of time, if necessary, after the label has been dispensed, particularly since the label is often not intended just for staying on the object for a short time, but rather mostly for identifying the object over an extended period of time of several months or years, for example. The characteristic according to which the further inscription, identification or item of information formed by the structured active substance surface is transferred from the rear side of the label to the object when the label is adhesively affixed merely means that the further inscription, identification or item of information of the label becomes "transferable" to the object, i.e. the process of transfer to the object (by means of its action or penetration into its surface) can begin and/or does begin starting from the point in time when the label is adhesively affixed or dispensed. The period of time that is then required so that the further inscription is transferred to the object with sufficient clarity can be very short or, depending on the embodiment and the type of active substance, can also be a longer period of time, for example a period of several hours, days, weeks or possibly months.

REFERENCE SYMBOL LIST

1 layer composite
2 colored laser film
3 adhesive film
3*a* rear side
4 active substance
4*a* paint solvent
4*b* luminescence substance
5 inscription
6 UV protection paint
7 adhesion-reducing substance
8 partial surface region
9 inscription field
10 label
10*a* rear side
10*b* front side
18 printing roll
19 dryer
20 vehicle paint
21 label film web
22 carrier film web
23 printing screen
24 active substance layer
25 vehicle part
26 UV protection layer
27 adhesion-reducing layer
30 carrier film
35 object
40 label composite
VIN vehicle identification number

The invention claimed is:

1. A label for identification of an object, wherein the label has the following:

a rear side, a basic label surface, an inscribable layer composite, in which a first, visible inscription can be formed for identification of an object having a surface, an adhesive film, with which the label can be adhesively affixed to the object, and an active substance, which penetrates into the surface of the object and/or acts on the surface of the object when the active substance is brought into contact with the surface of the object, wherein the active substance is disposed on the rear side, on the adhesive film or underneath the adhesive film, wherein the label has a structured active substance layer which is different from the adhesive film, in which structured active substance layer the active substance is disposed, wherein the structured active substance layer comprises a partial surface region or multiple partial surface regions of the basic label surface, but is left out in a remaining partial region of the basic label surface, wherein the label is free of active substance, over an entire layer thickness of the label, in the remaining partial region of the basic label surface, which is not spanned by the structured active substance layer, so that the label, when the label is adhesively affixed to the surface of the object, selectively brings the active substance into contact with the surface of the object in the partial surface region or the multiple partial surface regions of the structured active substance layer, wherein the structured active substance layer has a shape and/or contour configured in a form of a further inscription, identification or item of information, wherein the label has a structured adhesion-reducing layer and/or a structured UV protection layer between the structured active substance layer and the adhesive film structured to have identical coverage with the structured active substance layer and adhering more strongly to the structured active substance layer than to the adhesive film.

2. The label according to claim 1, wherein the contour of the structured active substance surface is configured as an inscription or marking or as a negative image of an inscription or a marking.

3. The label according to claim 1, wherein the structured active substance layer is a transparent paint layer that contains the active substance, imprinted onto a rear adhesive film side of the adhesive film.

4. The label according to claim 1, wherein the structured active substance layer is a paint layer that contains the active substance, imprinted onto a carrier film of the label, which paint layer is disposed on the adhesive film or underneath the adhesive film.

5. The label according to claim 1, wherein at least one of the structured active substance layer and the contour of the structured active substance layer is configured in a form of an alphanumeric inscription or alphanumeric marking or some other motif intended to be transferred to the object.

6. The label according to claim 1, wherein the structured active substance layer is the adhesive film and contains the active substance, wherein the adhesive film is structured over the basic label surface of the label, wherein the adhesive film that contains the active substance extends over the partial surface region or the multiple partial surface regions of the basic label surface of the label, but is left out in the remaining partial region of the basic label surface of the label.

7. The label according to claim 1, wherein the active substance is or contains a paint solvent or a medium that changes paint in some other way.

8. The label according to claim 1, wherein the active substance is or contains a luminescence substance that is capable of diffusion into paint.

9. The label according to claim 1, wherein the layer composite is configured as a non-transparent, inscribable or inscribed composite film.

10. The label according to claim 1, wherein the surface of the object is painted with a paint and the label is a label for identification of the surface of the object painted with the paint, wherein the active substance penetrates into the paint and/or acts on the paint when the active substance is brought into contact with the paint.

11. A label composite for ready-to-use inscription and dispensing of at least one label, comprising a carrier film and the at least one label according to claim 1, suitable for identification of the surface of the object, wherein the label is adhesively affixed, with the rear side of the label, to a side of the carrier film that has been coated in adhesion-reducing manner, wherein the active substance is contained in the structured active substance layer of the at least one label, wherein the structured active substance layer is disposed between the adhesive film of the at least one label and the carrier film and extends over the partial surface region or the multiple partial surface regions of the basic label surface of the at least one label.

12. A method for producing at least one label for identification of an object, wherein the method comprises the following:

making available a label film web, which has an inscribable layer composite and an adhesive film, and making available a carrier film web, imprinting at least one active substance layer having an active substance, which penetrates into a surface of the object and/or acts on a surface of the object when the active substance is brought into contact with the surface of the object, selectively onto partial surface regions of a rear side of the label film web and/or onto partial surface regions of a front side of the carrier film web, and joining together the label film web and the carrier film web in such a manner that the active substance layer comes to lie between the label film web and the carrier film web, and wherein the label film web is connected with the carrier film web, wherein the label film web and the carrier film web are separated from one another over certain segments and/or during certain periods of time, in order to imprint the active substance layer, and wherein the label film web and the carrier film web are joined together again after imprinting of the active substance layer.

13. A method for producing at least one label for identification of an object, wherein the method comprises the following:

making available a label film web, which has an inscribable layer composite and an adhesive film, and making available a carrier film web, imprinting at least one active substance layer having an active substance, which penetrates into a surface of the object and/or acts on a surface of the object when the active substance is brought into contact with the surface of the object, selectively onto partial surface regions of a rear side of the label film web and/or onto partial surface regions of a front side of the carrier film web, and joining together the label film web and the carrier film web in such a manner that the active substance layer comes to lie between the label film web and the carrier film web, wherein in the method, a label composite is produced, which has a label or a plurality of labels, wherein each label has the following:

a rear side, a basic label surface, an inscribable layer composite, in which a first, visible inscription can be formed for identification of an object having a surface, an adhesive film, with which the label can be adhesively affixed to the object, and an active substance, which penetrates into the surface of the object and/or acts on the surface of the object when the active substance is brought into contact with the surface of the object, wherein the active substance is disposed on the rear side, on the adhesive film or underneath the adhesive film, wherein the label has a structured active substance layer, in which the active substance is disposed, wherein the structured active substance layer comprises a partial surface region or multiple partial surface regions of the basic label surface, but is left out in a remaining partial region of the basic label surface, wherein the label is free of active substance, over an entire layer thickness of the label, in the remaining partial region of the basic label surface, which is not spanned by the structured active substance layer, so that the label, when the label is adhesively affixed to the surface of an object, selectively brings the active substance into contact with the surface of the object in the partial surface region or the multiple partial surface regions of the structured active substance layer, wherein the structured active substance layer has a shape and/or contour configured in a form of a further inscription, identification or item of information, and wherein the label has a structured adhesion-reducing layer and/or a structured UV protection layer between the structured active substance layer and the adhesive film structured to have identical coverage with the structured active substance layer and adhering more strongly to the structured active substance layer than to the adhesive film.

* * * * *